United States Patent
Akiyama et al.

(10) Patent No.: US 7,081,983 B2
(45) Date of Patent: Jul. 25, 2006

(54) WAVELENGTH CONVERSION DEVICE

(75) Inventors: Tomoyuki Akiyama, Kawasaki (JP);
Nobuaki Hatori, Kawasaki (JP);
Mitsuru Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/023,369

(22) Filed: Dec. 29, 2004

(65) Prior Publication Data

US 2005/0117200 A1  Jun. 2, 2005

Related U.S. Application Data

(63) Continuation of application No. PCT/JP03/11573, filed on Sep. 10, 2003.

(30) Foreign Application Priority Data

Sep. 19, 2002 (JP) ............................. 2002-273177

(51) Int. Cl.
*G02F 1/35* (2006.01)
*G02F 1/39* (2006.01)

(52) U.S. Cl. ..................... 359/326; 359/330

(58) Field of Classification Search ........ 359/326–332, 359/344
See application file for complete search history.

(56) References Cited

U.S. PATENT DOCUMENTS 6,541,788 B1 * 4/2003 Petroff et al. ................ 257/21

FOREIGN PATENT DOCUMENTS

| JP | 8-240820 | 9/1996 |
| JP | 11-326964 | * 11/1999 |
| JP | 2000-275692 | * 10/2000 |
| JP | 2001-77754 | 3/2001 |

OTHER PUBLICATIONS

Bilenca, et al., *InAs/InP 1550nm quantum dash semiconductor optical amplifiers*, Electronics Letters, vol. 38, No. 22, pp. 1350-1351, Oct. 24, 2002.

Akiyama et al., *Symmetric Highly Efficient (~0dB) Wavelength Conversion Based on Four-Wave Mixing in Quantum Dot Optical Amplifiers*, IEEE Photonics Technology Letters, vol. 14, No. 8, pp. 1139-1141, Aug. 2002.

Haruhiko Kuwatsuka, Hiroshi Ishikawa, *Handotai Ritoku Baishitsuchu no Yonkoha Kongo ni Yoru Hacho Henkan Iso Kyoyakuha*, Japanese Journal of Optics, vol. 27, No. 3, pp. 22-27, 1998.

* cited by examiner

*Primary Examiner*—John D. Lee
(74) *Attorney, Agent, or Firm*—Westerman, Hattori, Daniels & Adrian, LLP.

(57) ABSTRACT

A wavelength conversion device including a nonlinear medium having quantum dots uses a tunable laser as an excitation light source of optical four wave mixing, and performs wavelength conversion for a wide bandwidth signal light with optical four wave mixing by employing a control apparatus for controlling an optical system including an optical path of a signal light and an optical system including an optical path of an excitation light in correspondence with a wavelength of a signal light that is to be wavelength converted.

5 Claims, 6 Drawing Sheets

WAVELENGTH CONVERSION DEVICE

CROSS-REFERENCE TO RELATED APPLICATIONS

This application is a U.S. continuation application filed under 35 USC 111(a) claiming benefit under 35 USC 120 and 365(c) of PCT application JP03/11573, filed Sep. 10, 2003, which claims priority to application Ser. No. 2002-273177, filed in Japan on Sep. 19, 2002. The foregoing applications are hereby incorporated herein by reference.

BACKGROUND OF THE INVENTION

1. Field of the Invention

The present invention generally relates to an optical signal processing apparatus, and more particularly, a wavelength conversion device converting a high speed signal light to a given wavelength in a wide wavelength range by using optical four wave mixing.

In an all-optic network or a photonic network where signal lights of various wavelengths are used, a technology of converting one wavelength of a signal light to another wavelength is desired for preventing collision among signal lights of different channels, for achieving reuse of vacant wavelengths, or free connection between sub-networks.

2. Description of the Related Art

As a wavelength conversion technology using an all-optic process employing no photoelectric conversion of optic signals, an optical four wave mixing technology using a nonlinear medium is known.

FIG. 1 shows an example of wavelength conversion by optical four wave mixing using a traveling wave type semiconductor optical amplifier having a multiple quantum well (MQW) structure as a nonlinear medium.

With reference to FIG. 1, the semiconductor optical amplifier is formed on an $n^+$ type InP substrate 11, and includes an MQW active layer 12 having an InGaAs/InGaAsP structure being formed on the substrate 11, and a $p^+$ type InP clad layer 13 being formed on the active layer 12. The $n^+$ type substrate 11 is grounded, and a positive voltage is applied to the InP clad layer 13. As a result, the active layer 12 is in a gain state.

In the example of FIG. 1, a signal light 14 having an angular frequency ωs and an excitation light 15 having an angular frequency ωp are incident to one end of the semiconductor optical amplifier. When the signal light 14 and the excitation light 15 enters the biased optical amplifier in a gain state, other than the signal light 14 having an angular frequency ωs and the excitation light 15 having an angular frequency ωp, a phase conjugate wave 16 having an angular frequency of 2ωp−ωs is also obtained by optical four wave mixing, as shown in FIG. 2.

This is a phenomenon created in a case where the signal light 14 having an angular frequency of ωs (≠ωp) is incident to the MQW active layer 12 of the semiconductor optical amplifier excited by the excitation light 15 having an angular frequency ωp, in which two photons in the excitation light 15 and one photon in the signal light 14 interact to generate the phase conjugate wave 16 having a frequency of 2ωp−ωs.

Thus, the phase conjugate wave 16 having a frequency of 2ωp−ωs alone can be extracted by disposing a filter that removes the signal light 14 having an angular frequency ωs and the excitation light 15 having an angular frequency ωp at an outgoing end of the semiconductor optical amplifier of FIG. 1.

In the optical four wave mixing phase conjugate wave generation apparatus using such semiconductor optical amplifier, since a semiconductor active layer being an optic gain medium, that is, the MQW active layer 12 is used as a nonlinear type medium, a large nonlinear type effect can be attained, and a converted light in an active layer with a length of several 100 μm can be obtained.

However, with the conventional wavelength conversion device using optical four wave mixing, a conflict between the effect of CDP (Carrier Density Pulsation) and the effect of SHB (Spectral Hole Burning) occurs in a case where a semiconductor gain medium injected with a carrier, that is, a bulk semiconductor or a quantum well semiconductor is employed as a nonlinear type medium that causes optical four wave mixing. Depending on whether the difference in angular frequency between the excitation light 15 and the signal light 14 (Δω=ωp−ωs) is positive or negative, that is, whether the angular frequency ωs of the signal light 14 is more toward short wavelength or long wavelength with respect to the angular frequency ωp, the conflict causes a problem where conversion efficiency may become asymmetric, particularly, conversion efficiency from short wavelength to long wavelength may be deteriorated.

It is to be noted that "carrier density pulsation effect" is a phenomenon where wavelength difference, that is, angular frequency difference of incident laser light generates a beat in an electric field, and results to generation of a beat in the carrier density, thereby altering the carrier density. Meanwhile, "spectral hole burning effect" is an effect where a third order nonlinear polarization is created by virtual absorbing of light, in which a dip is created at a position of an oscillation wavelength in a gain spectrum of a semiconductor laser to reduce the gain.

That is, the conversion efficiency x of the optical four wave mixing phase conjugate wave generation apparatus is expressed as:

$$\chi \propto |\xi^{(3)}(\lambda_s)|^2 \cdot G(\lambda_s) \cdot P^2_{pump}$$

in a case of employing a third order nonlinear susceptibility $\xi^{(3)}$ of the third order nonlinear effect, and a susceptive linear gain G of the signal light 14, wherein $\lambda_s$ is the wavelength of the incident signal light 14, and wherein $P_{pump}$ is the power of excitation light 15. As a result of superposing the term corresponding to the carrier density pulsation effect and the term corresponding to the spectral hole burning effect, in a nonlinear medium having a typical quantum well structure, the third order nonlinear susceptibility has a property of being large when the wavelength of the signal light 14 is more toward a long wavelength (Δω>0), and being small when the wavelength of the signal light is more toward a short wavelength (Δω<0) with respect to the oscillation wavelength. The conversion efficiency x is affected by this property.

It is to be noted that $|\xi^{(3)}(\lambda s)|^2$ expresses a second power of the absolute value of $\xi^{(3)}(\lambda_s)$.

In Japanese Laid-Open Patent Application No. 11-326964, using a zero order carrier confining quantum structure, for example, a quantum dot, as a semiconductor gain medium is proposed for solving the problem of asymmetry of the conversion efficiency x. The zero order carrier confining quantum structure, such as quantum dot, forms a pseudo two level system, in which change of refractive index becomes zero in a resonance frequency in a same manner as a two level system, and hardly no modulation of refractive index due to the carrier density pulsation effect occurs.

Today there are various known techniques for forming a quantum dot.

For example, Japanese Laid-Open Patent Application No. 9-064476 or Japanese Laid-Open Patent Application No. 9-326506 shows a technology where hetero-epitaxial structure forming a strain with respect to a substrate is repeatedly stacked one on top of the other with an intermediary layer sandwiched therebetween, and using an island like area formed from self-organization by the so-called S-K mode (Stranski-Krastanow) as the quantum dot. Furthermore, Japanese Laid-Open Patent Application No. 2002-141548 describes a technology of forming a quantum dot on an apex part of an etch pit of a tetrahedron formed in a semiconductor layer.

Meanwhile, in a case of actually applying a wavelength conversion device using a nonlinear medium including quantum dot to a wideband photonic network, an optical four wave mixing wavelength conversion is to be executed with respect to a signal light of various wavelengths. Although an excitation light source is to be provided for each signal light wavelength used in the photonic network, such configuration increases the scale of the device, and raises cost considerably.

SUMMARY OF THE INVENTION

It is a general object of the present invention to provide a novel and useful wavelength conversion device that substantially obviates the aforementioned problems.

A more specific object of the present invention is to provide a wavelength conversion device using optical four wave mixing technology, being able to process signal light of wide bandwidths, and being able to obtain a same conversion efficiency either in a case where the wavelength of a signal light is longer or shorter than the wavelength of an excitation light.

Another object of the present invention is to provide a wavelength conversion device including a gain medium including quantum dots, a first optical system for injecting a signal light to the gain medium, a tunable laser, a second optical system for injecting a laser beam formed by the tunable laser to the gain medium, and a tunable filter for selectively extracting output light generated from optical four wave mixing in the gain medium.

With the present invention, by using a gain medium including quantum dots as a parametric oscillation nonlinear medium, a wavelength conversion device having satisfactory conversion efficiency either in a case where the wavelength of a signal light is longer or shorter than the wavelength of an excitation light, and being suitable for a wide bandwidth photonic network can be obtained. Particularly, with this wavelength conversion device, by using a tunable light source, for example, a tunable laser, as a light source of an excitation light, signal light of various wavelengths transmitted through a network can be processed. Here, with the present invention, large numbers of excitation light sources corresponding to the wavelengths of the signal light are not required, and controls, for example, for constantly maintaining the wavelength of the tunable light source more toward a short wavelength with respect to the signal light wavelength for attaining a high conversion efficiency are not required, thereby simplifying the configuration of the wavelength conversion device.

Features and advantages of the present invention will be set forth in the description which follows, and in part will become apparent from the description and the accompanying drawings, or may be learned by practice of the invention according to the teachings provided in the description.

DESCRIPTION OF THE PREFERRED EMBODIMENTS

First Embodiment

Figure 1:
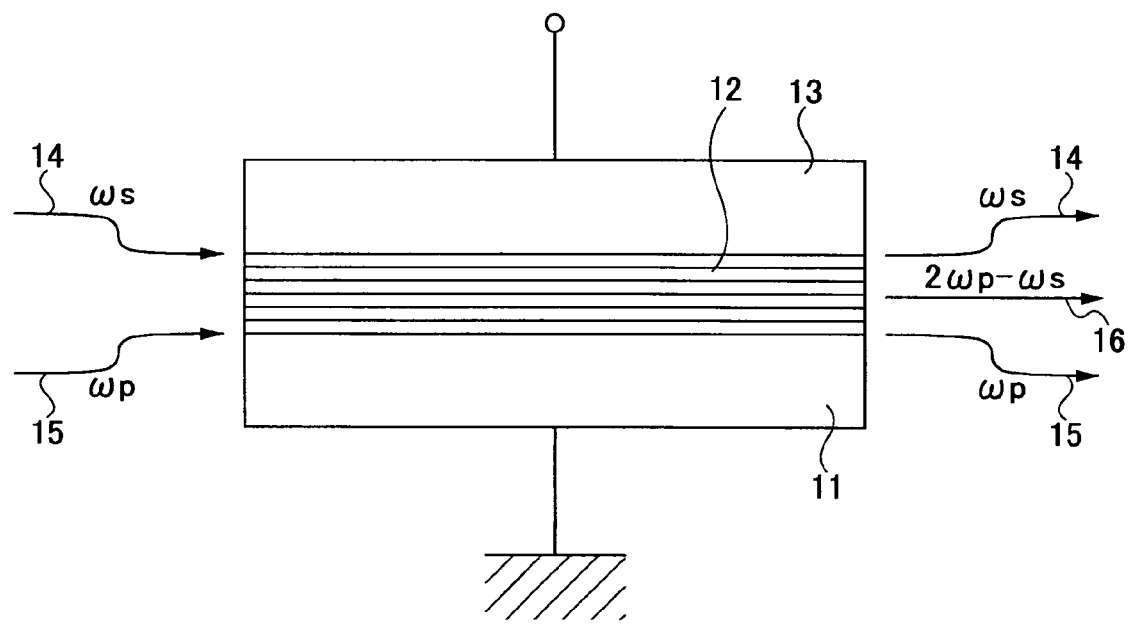
FIG. 1 is a drawing showing a configuration of a conventional optical four wave mixing wave conversion device using quantum well.
Figure 2:
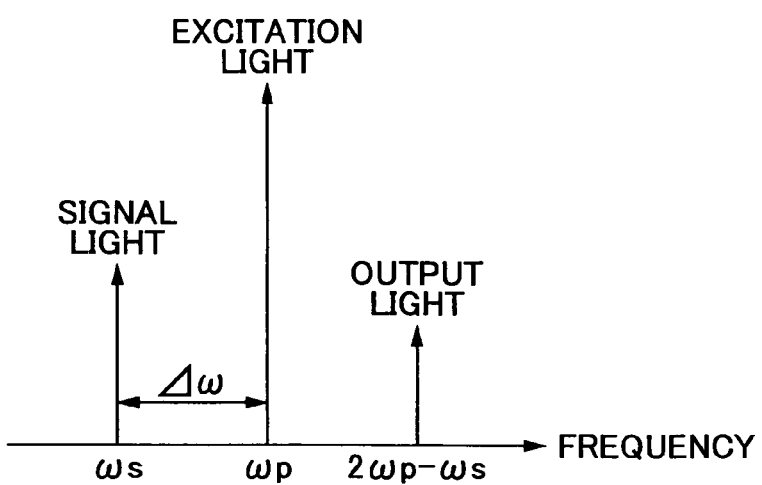
FIG. 2 is a drawing for explaining a principle of wavelength conversion with optical four wave mixing.
Figure 3A:
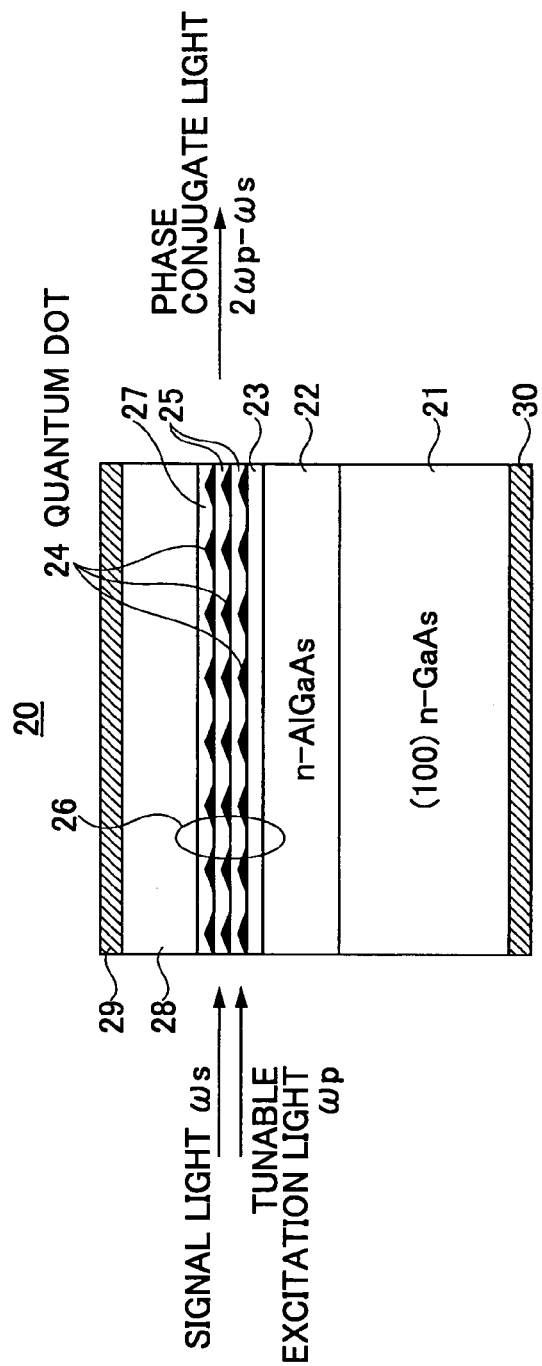
FIGS. 3A and 3B are drawings showing a configuration of an optical amplifier used as a nonlinear medium according to a first embodiment of the present invention.
Figure 3B:
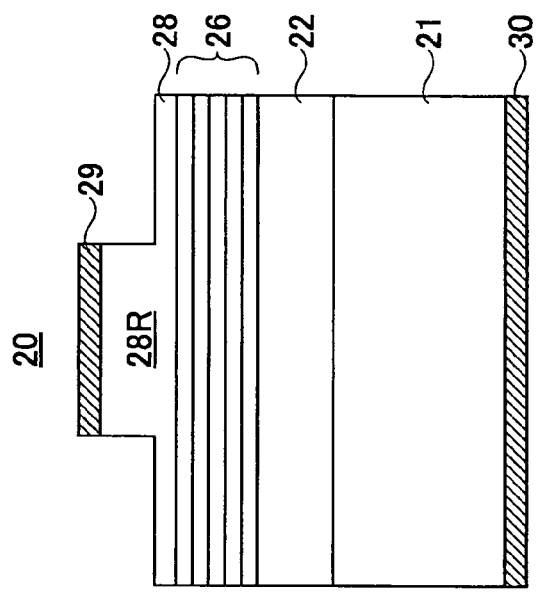

FIG. 3A and FIG. 3B show a configuration of a nonlinear medium 20 according to a first embodiment of the present invention. FIG. 3A is a perpendicular cross-sectional view along an axial direction of the nonlinear medium 20, and FIG. 3B is an end elevation view of the nonlinear medium 20.

With reference to FIG. 3A, the nonlinear medium 20 is disposed on an n type GaAs (100) orientation substrate 21, and includes an n type AlGaAs clad layer 22 formed on the substrate 21 and a lower part SCH layer 23 including non-doped GaAs formed on the clad layer 22.

An island-like area of non-doped InAs or InGaAs, which is formed by S-K mode growth using an MOVPE method or an MBE method, is formed on the SCH layer 23 as a quantum dot(s) 24. Furthermore, a non-doped GaAs barrier layer 25 is formed on the SCH layer 23 in a manner covering the quantum dots 24. Furthermore, the quantum dots 24 and the barrier 25 are repeated in 20–30 cycles to form an active layer 26. An upper part SCH layer 27 including non-doped GaAs is formed on the active layer 26.

For example, in a case of forming InAs quantum dots 24, a non-doped InAs layer of a 1.8 molecular layer is stacked on the SCH layer 23 or the barrier layer 25 under a substrate temperature of 510°. Accordingly, the InAs layer stacked on the GaAs layer 23 or 25 forms a strain from the lattice constant difference with respect to the GaAs substrate 21, and forms a droplet-like or island-like structure.

Furthermore, a p type AlGaAs clad layer 28 is formed on the upper part SCH layer 27. An upper part electrode 29 is formed on the clad layer 28 via a contact layer (not shown), and a lower part electrode 30 is formed at a bottom surface of the substrate 21.

With reference to the end elevation view of FIG. 3B, the nonlinear medium 20 includes a ridge structure 28 formed extending in an axial direction in the clad layer 28. Therefore, the light injected into the active layer 26 is waveguided in an axial direction in the medium 20 along the ridge structure.

By applying positive voltage to the upper part electrode 29 and applying negative voltage to the lower part electrode 30, the active layer 26 becomes into a gain state, thereby the nonlinear medium shown in FIGS. 3A and 3B serves as a traveling wave type optical amplifier for amplifying light supplied from one end.

The third order complex susceptibility $x^{(3)}$ of the nonlinear medium is expressed as, $$x^{(3)} = \Sigma x^{(3)} m = \Sigma x^{(3)} m, \Delta f = 0 (1 - i 2\pi \Delta f \tau m)^{-1} \quad (1)$$

as a sum of a nonlinear process such as the carrier density pulsation process or the spectral hole burning process. Here, however, m represents a nonlinear process, $\Delta f$ represents the frequency difference corresponding to the angular frequency difference $\Delta \omega$, $\tau m$ represents a time constant of the nonlinear process m, and $x^{(3)} m, \Delta f = 0$ represents the third order complex susceptibility with respect to the nonlinear process m in a case of $\Delta f = 0$.

Figure 4:
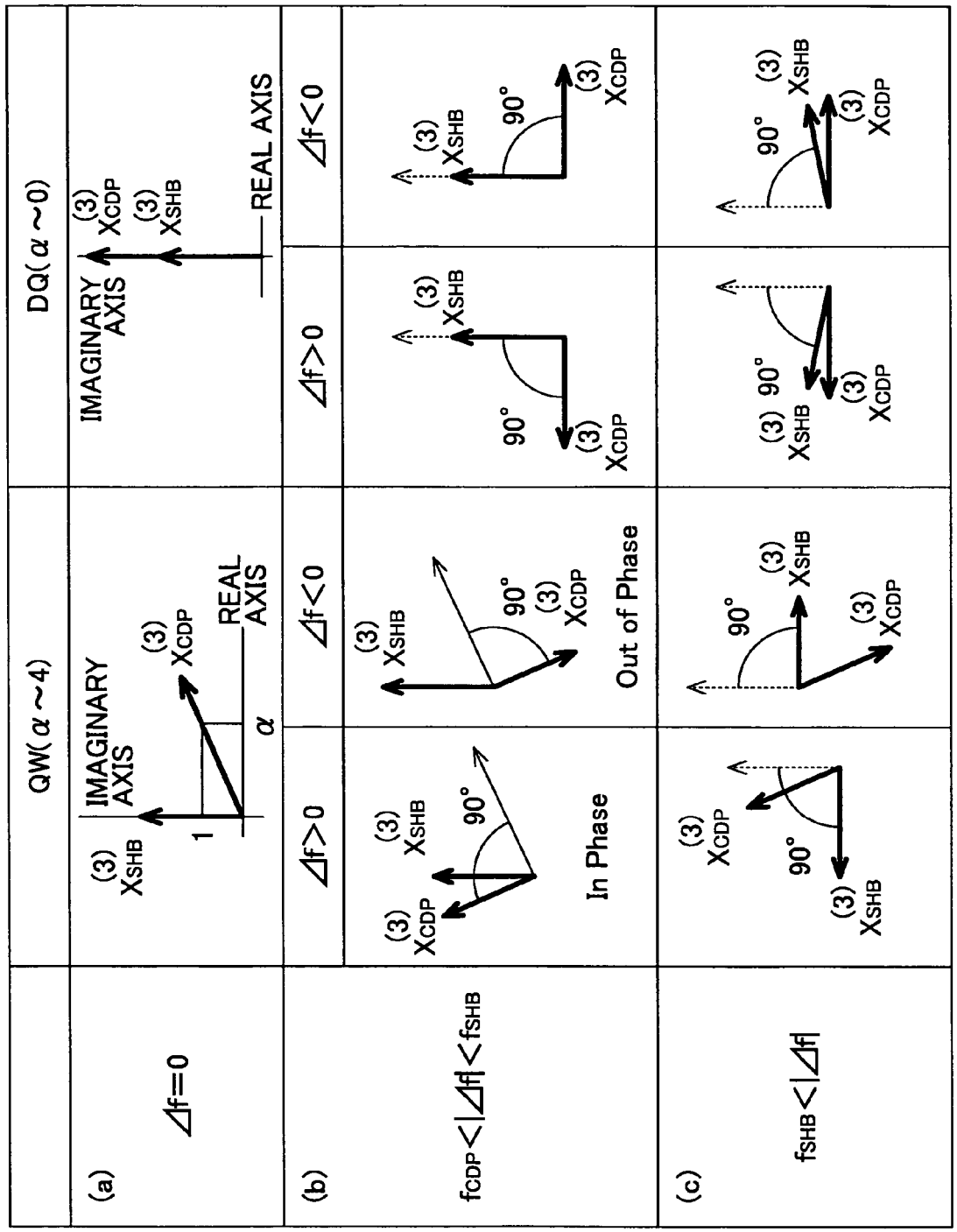
FIG. 4 is a drawing showing operation of the optical amplifier of FIG. 3 in comparison with a conventional optical.amplifier including a quantum well structure.

FIG. 4 shows a relation of third order susceptibilities $x^{(3)}$ SHB and $x^{(3)}$ CDP obtained by varying the frequency difference for a typical quantum well (QW9 and a quantum dot (QD) illustrated on a complex plane (Akiyama, et al. Non-Patent Document 1). Here, however, the third order susceptibilities $x^{(3)}$ SHB and $x^{(3)}$ CDP represent the third order susceptibility $x^{(3)}$ in a spectral burning process and a carrier density pulsation process, respectively. Since there is no spectral hole burning process and carrier density pulsation process corresponding to the quantum well in a case of quantum dot, the spectral hole burning process of the quantum dot is defined as a state where only a ground state carrier is exhausted with respect to a single given quantum dot. The exhausted state is relieved by supplying carriers in another state from the same quantum dot. Furthermore, the carrier density pulsation process of the quantum dot is defined as a state where all carriers in a given quantum dot are exhausted.

With reference to FIG. 4, in a case where the frequency difference $\Delta f$ is zero, it is apparent that both the third order susceptibilities $x^{(3)}$ SHB and $x^{(3)}$CDP are. situated on an imaginary axis in a quantum dot (DQ); meanwhile, in a quantum well (QW), the third order susceptibility $x^{(3)}$ SHB is situated on an imaginary axis, and the third order susceptibility $x^{(3)}$CDP is deviated from the third order susceptibility $x^{(3)}$ SHB to an extent of a deviation angle corresponding to a line width increase coefficient α of the quantum well.

Meanwhile, when the frequency difference Δf increases toward a positive direction or a negative direction, the vector of the third order susceptibility $x^{(3)}$CDP rotates in a counter-clockwise direction when Δf is positive, and in a clockwise direction when Δf is positive in a range where the absolute value of the frequency difference Δf is smaller than f SHB, and is larger than f CDP (f SHB and F CDP are inverse numbers of the time constant of the processes, respectively). As a result, in a typical quantum well structure, the vectors of the third order susceptibilities $x^{(3)}$ SHB and $x^{(3)}$CDP act in a manner intensifying each other in a case where Δf is negative, and the vectors of the third order susceptibilities $x^{(3)}$ SHB and $x^{(3)}$CDP act in a manner erasing each other in a case where Δf is negative. This is causes asymmetry during wavelength conversion employing optical four wave mixing in a conventional nonlinear medium using quantum well.

Meanwhile, in a case of using a quantum dot structure of FIGS. 3A and 3B, the vector of the third order susceptibility $x^{(3)}$ SHB is situated on an imaginary axis under a condition of $\Delta f = 0$. Therefore, whether the vector of the third order susceptibility $x^{(3)}$ CDP rotates right wise or left wise, the change of the entire third order susceptibility $x^{(3)}$ become symmetric at the positive and negative of $\Delta f$.

Furthermore, in a case where the absolute value of the frequency difference $\Delta f$ exceeds f SHB, the vector of the third order susceptibility $x^{(3)}$ SHB rotates left wise or right wise in a case where $\Delta f$ is positive or negative. However, with the nonlinear medium having a quantum dot structure, it is apparent that the vectors of the third order susceptibilities $x^{(3)}$ SHB and $x^{(3)}$CDP act in a manner intensifying each other.

Figure 5B:
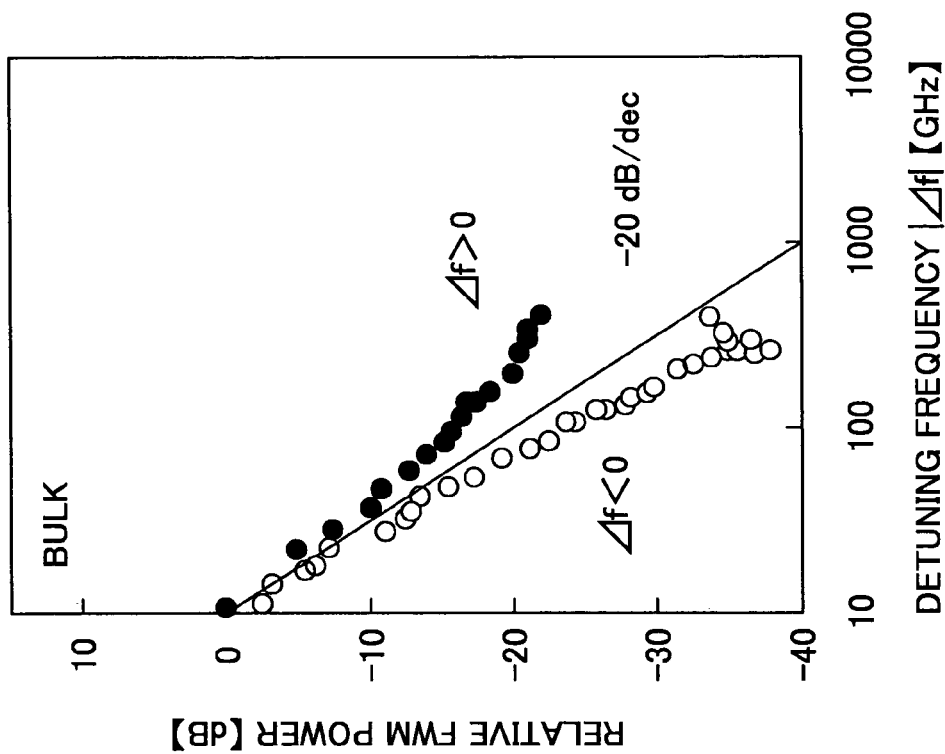
FIGS. 5A and 5B are drawings showing an effect of optical four wave mixing by using the optical amplifier shown in FIGS. 3A and 3B in comparison with a case of using a conventional bulk structure.
Figure 5A:
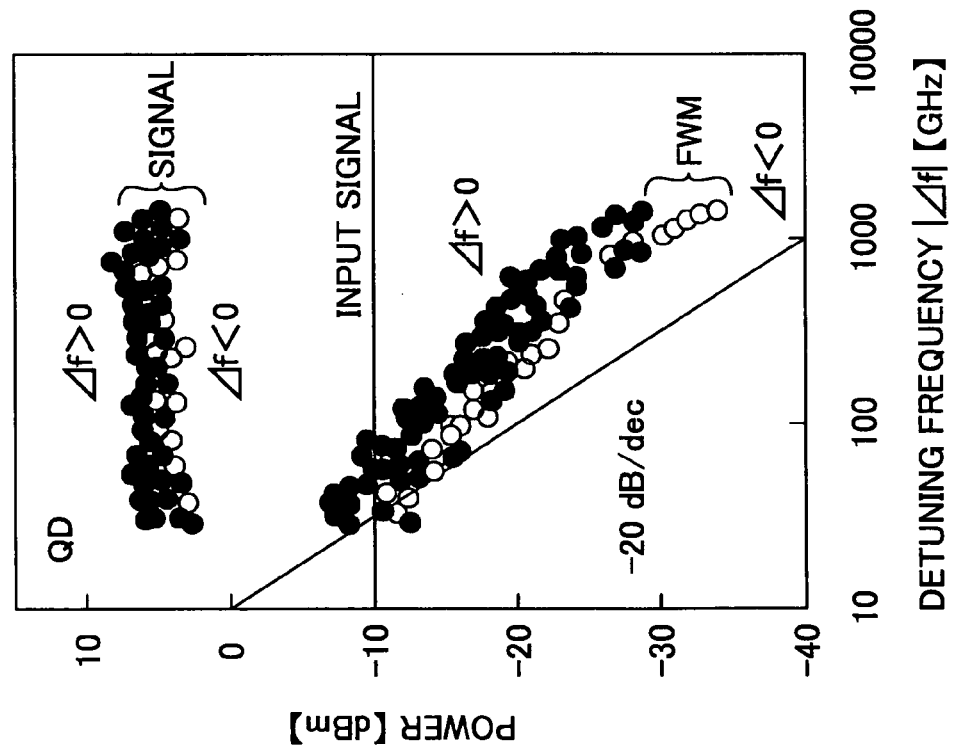

FIG. 5A is a drawing showing the power of the output light obtained from optical four wave mixing in the nonlinear medium 20 including the quantum dot of FIGS. 3A and 3B in a normalized manner with respect to input signal light power in a cases where the frequency difference $\Delta f$ is positive and negative. Furthermore, FIG. 5B is a drawing for comparison showing the power of the output light obtained from optical four wave mixing in a nonlinear medium including a typical bulk structure in a normalized manner with respect to input signal light power in cases where the frequency difference $\Delta f$ is positive (indicated with ●)and negative (indicated with ○). In the drawings, the horizontal axes indicate the absolute value of the frequency difference $\Delta f$.

In FIG. 5A, in which FMW in the drawings indicates the output wavelength-converted light from optical four wave mixing, it is apparent that there is hardly any difference in a case where Δf is positive and where Δf is negative. Furthermore, FIG. 5A also shows the power of the amplified signal light in the nonlinear medium 20. The sample employed in the experiment of FIG. 5A includes an InGaAS layer having a composition of InAs of $In_{0.17}Ga_{0.83}As$ grown as the barrier layer 25 on the quantum dots 24 having a composition of InAs, a ridge waveguide path 28R with a width of 10 μm, and a length with respect to the optical axis of 25 mm.

Meanwhile, in a case of a conventional bulk structure in FIG. 5B, it is apparent that the power of the wave-length converted light differs considerably between a case where Δf is positive and negative, and that the above-described asymmetry has appeared.

Furthermore, the dependency of the output light power with respect to frequency difference $\Delta f$ is reduced compared to the case of FIG. 5B by using the nonlinear medium including the quantum dot where the line width increase coefficient α is zero.

Accordingly, with the present invention, the same wavelength conversion efficiency can be obtained whether the frequency difference $\Delta f$ is positive or negative during optical four wave mixing, and wavelength conversion for input signal light of wide wavelength range can be achieved.

Second Embodiment

Figure 6:
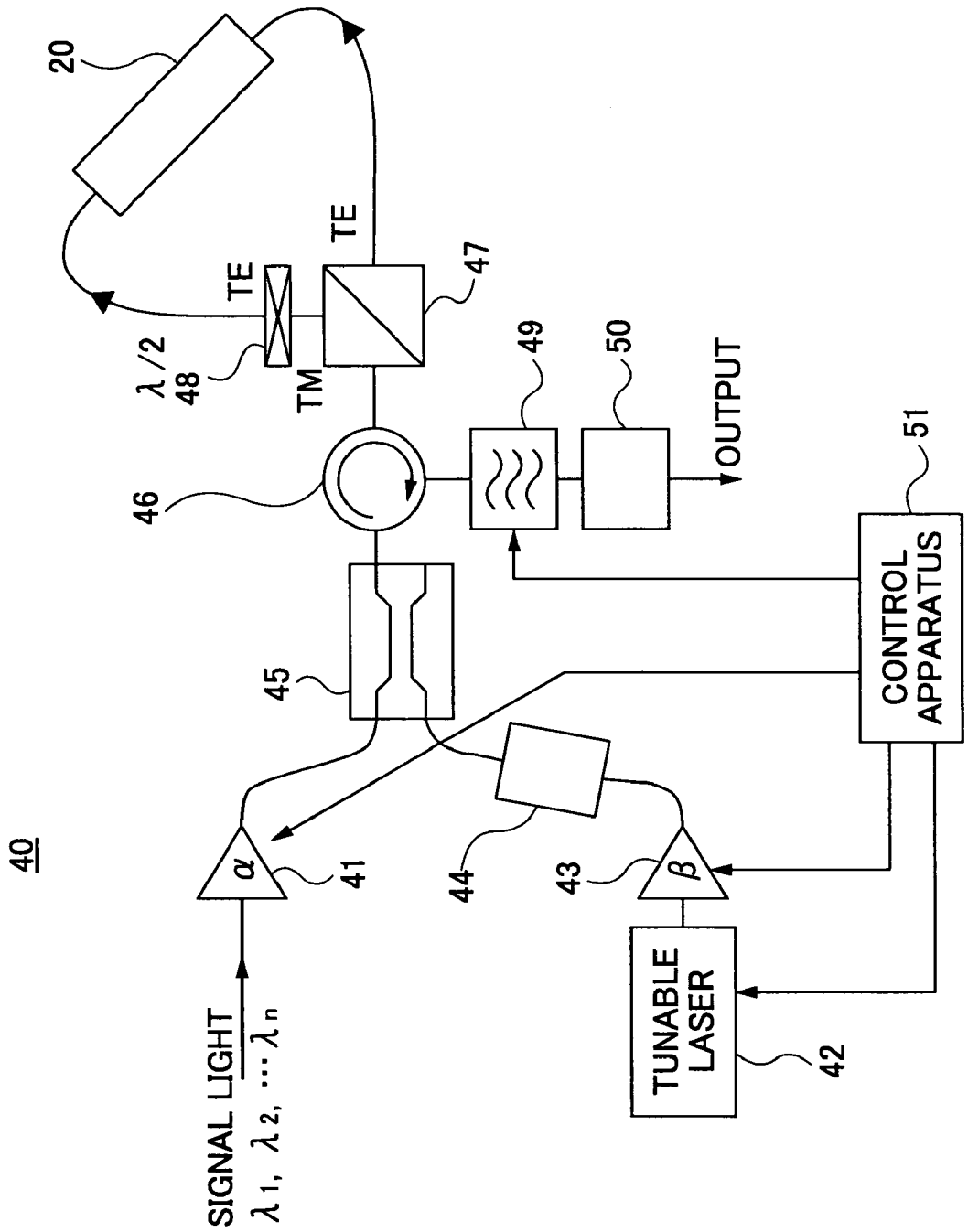
FIG. 6 is a drawing showing a structure of a wavelength conversion system according to a second embodiment of the present invention.

FIG. 6 shows a configuration of a wavelength conversion system 40 according to a second embodiment of the present invention. In the drawing, like components corresponding to the above-described components are denoted by like reference numerals and will not be further explained.

With reference to FIG. 6, any one of the signal light having a wavelength of $\lambda_1, \lambda_2 \ldots \lambda_n$ is supplied to the wavelength conversion system 40 which includes an optical amplifier 41 for amplifying the signal light with an amplification factor $\alpha$, a tunable laser 42, and an optical amplifier 43 for amplifying an output laser light from the tunable laser 42 with an amplification factor $\beta$. The signal light amplified in the optical amplifier 41 and the laser light amplified in the optical amplifier 42 are coupled in an optical coupler 45.

Furthermore, the signal light and the laser light are supplied from the optical coupler 45 to the quantum dot optical amplifier 20 shown in FIGS. 3A and 3B via an optical circulator 46 and a polarization beam splitter.

In the polarization beam splitter 47, a transmitted light of a TE mode is extracted from one optical port, and a reflected light of a TM mode is extracted from another optical port. Accordingly, a ½ wavelength plate 48 is inserted in the optical port from which the TM mode light is extracted, and thus the TM mode light is converted to a TE mode light that allows process by the quantum dot optical amplifier 20.

In the quantum dot optical amplifier 20 shown in FIGS. 3A and 3B, the confinement of the carrier in a perpendicular direction of the substrate 21 is strong, and the confinement of the carrier in a horizontal direction of the substrate 21 is weak since each of the quantum dots 24 has a height not more than 1–2 nm, and a diameter of 20–3 nm. Accordingly, with such flat self-organized quantum dots 24 grown by the S-K mode, only the TE mode light, which forms an electric field parallel to the substrate plane, interacts with electron waves having a perpendicular wave vector, and the TM mode light, which has an electric field perpendicular to the substrate plane, is unable to interact with the electrons in the quantum dots 24.

According to the configuration of FIG. 6, the light extracted by the polarization beam splitter 47 is guided to the quantum dot optical amplifier 20 as TE mode light, and is efficiently wavelength-converted by optical four wave mixing.

As a result of the wavelength conversion by the optical four wave mixing, an output light having an angular frequency of $2\omega p-\omega s$, as described above, is obtained with the quantum dot optical amplifier 20. The obtained output light is extracted from the optical circulator 46, has signal light components and excitation light components removed therefrom by the tunable filter 49, and is then discharged from a gain equalizer 50.

In the configuration of FIG. 6, in order to be able to process signal lights of wide bandwidths, a control apparatus 51 is provided for controlling the tunable laser 42 and the tunable filter 49 according to wavelength of the signal light that is to be processed.

As described above, since the quantum dots are formed in the nonlinear medium, a substantially same value can be obtained from the power of the output light formed by the quantum dot optical amplifier 20 whether the value of $\varDelta f$ is positive or negative. However, as shown in FIG. 5A, the power of the output light decreases as the frequency difference $\varDelta f$ increases. Here, it is apparent that the output light power expressed in units of decibels decreases in an approximately linear manner when the absolute value of $\varDelta f$ is within the range of 1000 GHz.

Therefore, in order to compensate for the decrease of the output light power associated with the increase in frequency difference $\varDelta f$, the control apparatus 51 in the configuration of FIG. 6 controls the oscillation wavelength of the tunable laser 42 so that the absolute value of the frequency difference $\varDelta f$ falls within approximately 1000 GHz. Here, with the configuration of the present invention, since the wavelength of the excitation light needs not to be more toward long wavelength than the wavelength of the signal light, a frequency range of approximately ±1000 GHz can be covered by setting a single laser oscillation frequency. Furthermore, with the present invention, wavelength conversion of incoming signal light of wide bandwidths can be achieved by altering the oscillation wavelength of the tunable laser 42 according to the wavelength of the incoming signal in an interval of, for example, 2000 GHz, with the control apparatus 51. Furthermore, with the present invention, the tunable range of the excitation light needed for the excitation light source is half of that of the conventional quantum well, thereby the configuration and control of the tunable laser 42 can be substantially simplified.

Figure 7:
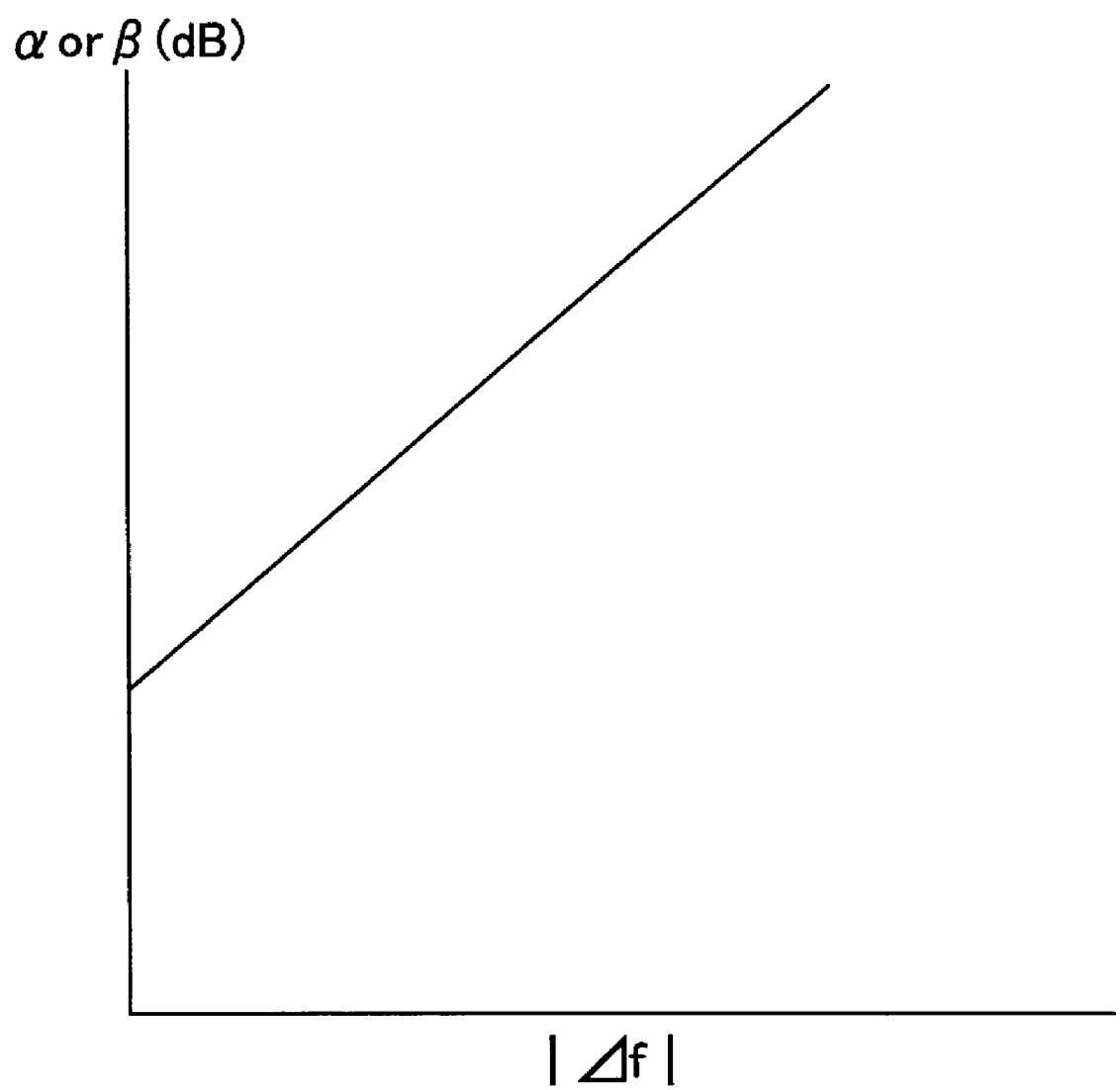
FIG. 7 is a drawing for explaining control of an optical amplifier in the wavelength conversion system of FIG. 6.1

Furthermore, since the control apparatus 51 of FIG. 6 compensates the decrease of the output light power due to the frequency difference $\varDelta f$ as shown in FIG. 5, the amplifications $\alpha$ and $\beta$ of the optical amplifiers 41 and 43 shown in FIG. 7 can be controlled in a manner shown in FIG. 7.

More specifically, the control apparatus 51 increases the values of the amplifications $\alpha$ and $\beta$ of the optical amplifiers 41 and 43 indicated in units of decibels in an approximately linear manner in correspondence with the absolute value of the frequency difference $\varDelta f$. Accordingly, a sufficient output strength can be realized for the tunable light even when the frequency difference $\varDelta f$ is large, for example, in the vicinity of the ±1000 GHz limit.

The present invention using the tunable laser 42 as the excitation light source and controlling the tunable laser 42 and the optical amplifier 41, 43 with the control apparatus 51 provides an advantageous characteristic of achieving a simple control for the control apparatus 51.

It is to be noted that, although the quantum dot of the nonlinear medium 20 is described above as an example of a self-organized quantum dot grown on a substrate with an S-K mode, the present invention is not limited to a particular quantum dot. For example, a type of quantum dot formed by using an etch pit in a semiconductor layer, as shown in Japanese Laid-Open Patent Application No. 2002-141548, may alternatively be used.

With the present invention, in the configuration of FIGS. 3A and 3B, an n type InP may be used for the substrate 21, a non-doped InP may be used for the SCH layer 23 and the barrier layer 25, and InAs may be used for the quantum dot.

With the present invention, in a wave conversion device performing wave conversion by optical four wave mixing with use of a nonlinear medium including quantum dots, wave conversion can be performed, with a simple configuration, for an incoming signal light of wide wave range such as those used in a wide bandwidth photonic network by using a tunable laser as an excitation light source.

Further, the present invention is not limited to these embodiments, but various variations and modifications may be made without departing from the scope of the present invention.

What is claimed is:

1. A wavelength conversion device comprising:
   a gain medium including quantum dots;
   a first optical system for injecting a signal light to the gain medium;
   a tunable laser;

a second optical system for injecting a laser light formed by the tunable laser to the gain medium; and a tunable filter for selectively extracting output light generated from optical four wave mixing in the gain medium, wherein the first optical system includes a first optical amplifier for amplifying the signal light with a first amplification factor, wherein the second optical system includes a second amplifier for amplifying the laser light with a second amplification factor, the wavelength conversion device further including a control apparatus for controlling the first and second optical amplifiers, the control apparatus altering the first and second amplification factors based on an absolute value of a difference between a wavelength of the signal light and a wavelength of the laser light.

2. The wavelength conversion apparatus as claimed in claim 1, wherein the control apparatus alters the first and second amplification factors expressed in units of decibels in an approximately linear manner in correspondence with the absolute value of the difference between the wavelength of the signal light and the wavelength of the laser light.

3. The wavelength conversion device as claimed in claim 1, wherein after passing through the first and second optical systems, the signal light and the laser light are coupled in an optical coupler, and furthermore, divided by a polarization beam splitter and supplied to the gain medium.

4. The wavelength conversion device as claimed in claim 3, wherein the output light is extracted by an optical circulator disposed between the optical coupler and the polarization beam splitter.

5. The wavelength conversion device as claimed in claim 4, wherein one of the optical paths from the polarization beam splitter to the gain medium includes an optical mode conversion element for converting a mode of a light traveling in the one of the optical paths from TM mode to TE mode.

* * * * *